June 28, 1966 O. BURLAK 3,258,614
SHIFT REGISTER EMPLOYING AN ENERGY STORAGE MEANS
FOR EACH FOUR-LAYER DIODE IN EACH STAGE
Filed Aug. 27, 1964
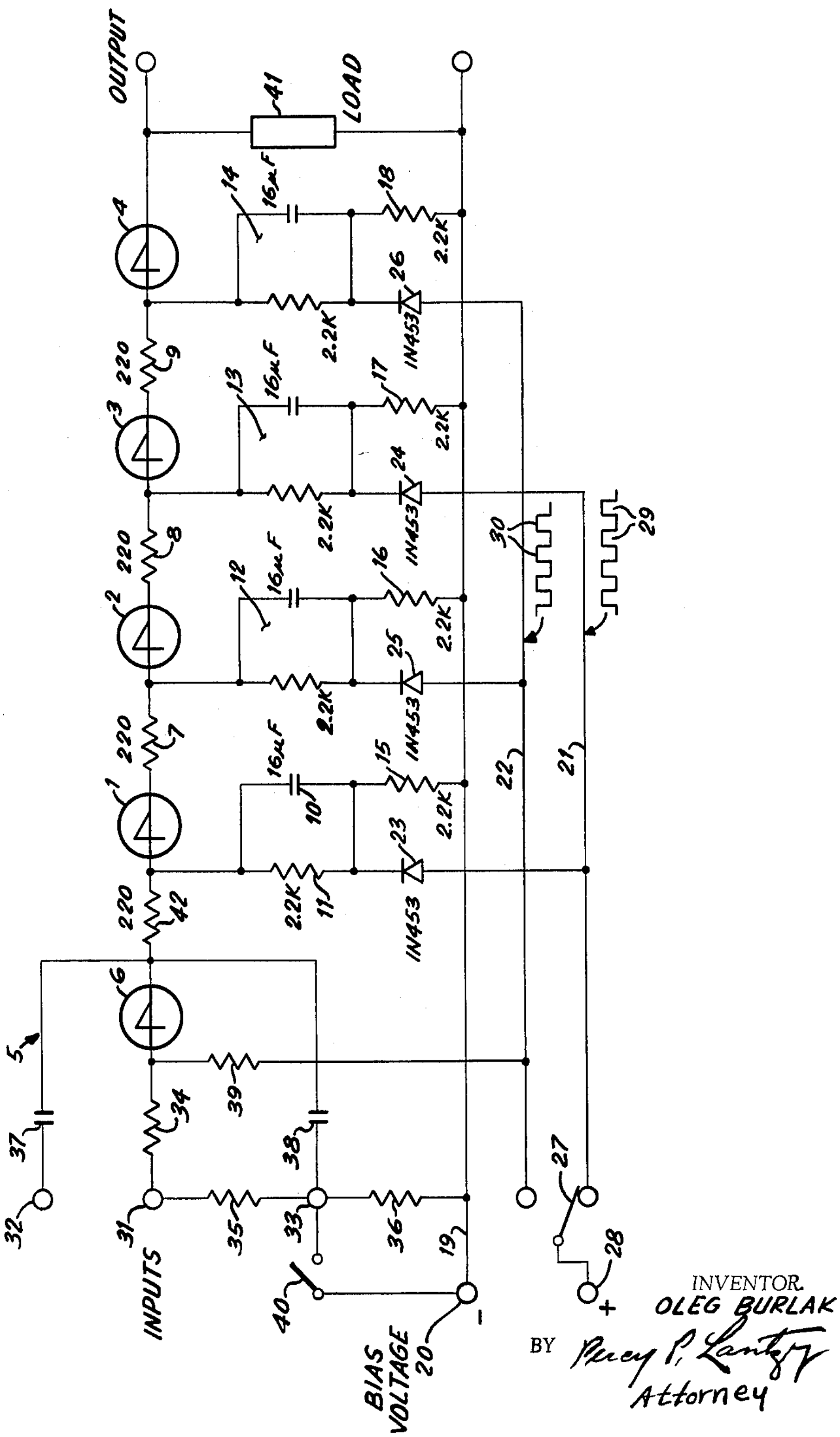
INVENTOR.
OLEG BURLAK
BY Percy P. Lantzy
Attorney United States Patent Office 3,258,614

Patented June 28, 1966

3,258,614

SHIFT REGISTER EMPLOYING AN ENERGY STORAGE MEANS FOR EACH FOUR-LAYER DIODE IN EACH STAGE

Oleg Burlak, Paterson, N.J., assignor to International Telephone and Telegraph Corporation, Nutley, N.J., a corporation of Maryland Filed Aug. 27, 1964, Ser. No. 392,501
4 Claims. (Cl. 307—88.5)

This invention relates to shift registers and has for its principal object to provide a shift register which is economical to construct and operate, and, at the same time, is very reliable, making it a useful tool in the automation industry.

One of the objects of the invention is to provide a shift register in which the cost of the principal element in each stage is lower than corresponding elements heretofore used in shift registers.

Another object of the invention is to provide a shift register which has great simplicity in application and therefore has many uses in the automation field.

Another object of the invention is to provide a shift register which has the ability to drive high current loads directly.

Still another object of the invention is to provide a shift register which is less sensitive to transient voltages, so that it has a high accuracy of operation.

Other objects and object relating to the construction and assembly of the parts of the circuit will appear as the description proceeds.

The invention is illustrated in the accompanying drawing, in which the single figure represents a circuit diagram of a shift register embodying the invention.

The objects of the invention are achieved by using a four-layer diode in each stage associated with an energy storage circuit so arranged that the diode cannot be triggered unless energy is stored in the storage circuit.

In order to illustrate the invention, a four stage shift register having four-layer diodes 1, 2, 3, and 4 is shown. These diodes are PNPN diodes, and may be of the type known in the trade as "Shockley 4E Series" diodes. These diodes require a predetermined voltage across their two terminals to trigger them into conducting condition, and when once triggered, will continue to conduct with a lower voltage across their terminals.

An input circuit 5 is shown at the left of the drawing, and it is also provided with a four-layer diode 6 of the same type as the others and poled so as to permit current to flow towards the stages of the register.

The diodes 1, 2, 3, and 4 are connected in series with a resistor 7 between diodes 1 and 2, a resistor 8 between diodes 2 and 3, and a resistor 9 between diodes 3 and 4. The diodes are poled so as to permit current to flow from the left or input of the circuit towards the right or output.

Each diode has an energy storage circuit connected to the left or input terminal. This circuit may comprise a capacitor 10, shunted by a resistor 11, as shown connected to the diode 1. The other diodes have similar energy storage circuits 12, 13, and 14, respectively. The other sides of these storage circuits are connected through resistors 15, 16, 17, and 18, respectively, to a lead 19 which is in turn connected to a negative source of bias potential, indicated at 20.

Trigger voltages are supplied to the diodes alternately for causing the register to shift. To this end, two shift leads 21 and 22 are provided. Shift lead 21 is connected to the storage circuits of diodes 1 and 3 through respective rectifiers 23 and 24 which are provided to prevent feedback of current. Shift lead 22 is connected to storage circuits 12 and 14 through rectifiers 25 and 26, respectively.

The shift leads 21 and 22 are supplied with continuous trains of spaced pulses, with the pulses of lead 22 being staggered with respect to those of lead 21. This may be accomplished by means of an electronic or other suitable type of switch 27 which is connected to a source of positive potential 28 and which is arranged to connect the source to first one shift lead and then to the other at a continuous repetition rate. Thus a train 29 of positive voltage pulses will appear on the lead 21, and a train of positive voltage pulses 30, staggered with respect to the pulses 29, will appear on the lead 22.

The input circuit 5 with its four-layer diode 6 is arranged to receive any type of signal input. Three input terminals 31, 32, and 33 are shown. Input terminal 31 is connected to the left terminal of diode 6 over a resistor 34 and also to the lead 19 over series resistors 35 and 36. Input terminal 32 is connected to the right terminal of diode 6 over a coupling capacitor 37. And input terminal 33 is at the junction of resistors 35 and 36, and is connected also to the right terminal of the diode over a capacitor 38. The left terminal of the four-layer diode 6 is biased positively by connecting it over series resistor 39 when a voltage appears on the shift lead 22.

The right terminal of the four-layer diode 4 provides the output of the register, and a load 41 is shown connected between this terminal and the negative bias lead 19.

The operation of the input circuit will first be described. With the arrangement shown, the left terminal of the diode 6 is connected to a point in a voltage divider circuit between the shift lead 22 and the negative bias lead 19 comprising resistors 39, 34, 35, and 36. The right terminal of the diode 6 is connected over resistors 42, 11, and 15 to the negative bias lead 19. The values of the resistors are so chosen that when a positive pulse appears on the shift lead 22, the voltage across the diode 6 will normally be just below the triggering voltage. If now a signal in the form of a positive pulse is applied to the input terminal 31 while the positive pulse is being applied to the juncture of resistor 39 from the shift lead 22, the voltage at the left terminal of the diode 6 will be raised sufficiently to rise above the triggering voltage of the diode. The diode will thus suddenly become conductive and current will continue to flow for the duration of the shift pulse from the lead 22, over resistor 39, through the diode, and through resistors 42, 11, and 15 to the bias lead 19, thus charging the capacitor 10 which is across the resistor 11.

If it is desired to use a negative input signal, it is applied to the terminal 32. This signal will drive the right terminal of the diode 6 in the negative direction over the coupling capacitor 37 to produce the effect of raising the voltage across the diode above the triggering potential, assuming the positive pulse from the shift lead 22 is present. Once the diode is triggered, current will then flow, as explained before, for the duration of the positive shift pulse.

If it is desired to use a switch for triggering in state, a negative potential may be connected to the terminal 33, where through switch 40 at instant the switch closes it will raise the potential across the diode 6 above the triggering potential to render the diode conducting, as explained.

Other simple changes in the input circuit may be made to adapt it for receiving other types of input signals.

The operation of the shift register stages will now be described. Assuming that an input signal has rendered the diode 6 conductive, current will flow through it, as already described, and will charge the capacitor 10. The signal is now stored in the first stage of the register. At the termination of the voltage pulse on the shift lead 22, a corresponding pulse will appear on the shift lead 21.

This pulse will pass through the rectifier 23 and will be applied to the lower terminal of the capacitor 10. Because of the charge on this capacitor, the left terminal of the four-layer diode 1 will have its potential raised above the value it would have received if the capacitor had not been charged, this potential being sufficient to trigger the diode 1.

Triggering the diode 1 will cause it to conduct and current will flow from the shift lead 21, through the rectifier 23, resistor 11, diode 1, resistor 7, the charging circuit 12, containing a capacitor similar to the capacitor 10, resistor 16, to the negative bias lead 19. The signal has now been shifted to the second stage of the register at the input for the four-layer diode 2.

If no further signal appears on the input circuit, the capacitor 10 will meanwhile discharge over the resistor 11, this resistor having a value sufficient to permit the discharge of the capacitor between shift pulses appearing on the lead 22.

At the termination of the voltage pulse on the shift lead 21, the pulse will appear again on the shift lead 22 and will pass over the rectifier 25 to boost the voltage on the left terminal of the four-layer diode 2 above the triggering potential because of the charge on the capacitor of the charging circuit 12. Thus the diode 2 becomes conductive, a charge is transferred to the capacitor in the charging circuit 13, and the signal has been transferred to the next stage of the register.

In like manner the signal will pass on to the last stage of the register and will be applied to the load 41 upon the next pulse appearance on the shift lead 22.

The input signals should be applied sequentially and at the same rate as the shift pulses are applied to the shift lead 22.

As long as signals are applied to the input circuit, they will pass step-by-step through the register, each charging circuit being charged by the triggering of the four-layer diode in the previous stage. And if input signals stop, the signals stored in any stages of the register will continue to shift towards and out of the output circuit as the shift pulses are continuously applied to the shift leads.

The circuit is ideally suited for automatic testing, sorting, and classifying equipment. While the response characteristics of the four-layer diodes limit the circuit to frequencies in the order of 20 kilocycles, the speed in most handling operations is dictated by the rate of operation of the mechanical devices involved, which is usually well below the 20 kilocycle rate. The circuit is also useful in information handling systems where the requirements for speed of operation fall within the limitations of the four-layer diode.

The circuit is also able to drive high current loads, such as relays, solenoids, or incandescent lamp displays, directly without the use of additional active components. Because of the reduction in the number of components required over register circuits using conventional transistors or electromechanical devices, the circuit of the invention has the great advantage over such other circuits of economy and reliability. It also has the ability to withstand transient voltages, so that its operation is more accurate and reliable.

While one embodiment of the invention with four register stages has been shown and described, any number of stages may be used and other changes in the arrangements of the components may be made. Therefore I do not desire to limit myself to what has been shown and described except by the limitations contained in the appended claims.

I claim:

1. A shift register comprising:
(a) an input circuit;
(b) an output circuit;
(c) a plurality of four-layer diodes, having input and output terminals, connected in series between said input circuit and said output circuit, said diode being poled to permit current flow from said input towards said output circuit;
(d) a resistor connected between every two of said diodes;
(e) a source of negative bias potential;
(f) an energy storage means for each diode connected between said bias potential source and the input terminal of said diode;
(g) means for producing first and second trains of spaced voltage pulses, the pulses of said second train being staggered with respect to those of said first pulse trains;
(h) means for applying the pulses of said first train from said pulse-producing means simultaneously to the bias-potential side of the energy storage means associated with alternate diodes; and
(i) means for applying the pulses of said second train from said pulse-producing means simultaneously to the bias-potential side of the remaining storage means.

2. A shift register, as defined in claim 1, in which the four-layer diodes are PNPN diodes.

3. A shift register, as defined in claim 2, in which each storage means comprises a capacitor shunted with a resistor of such value that said capacitor will discharge in the time period between adjacent voltage pulses from the pulse-producing means.

4. A shift register, as defined in claim 3, in which the input circuit comprises:
(a) a four-layer diode having an input and output connection and poled for flow of current towards the series connected diode nearest the input circuit;
(b) a plurality of input terminals, each adapted for receiving a different type of input signal;
(c) means connecting one of said terminals to the input connection of said four-layer diode; and
(d) means connecting another of said terminals to the output connection of said four-layer diode.

References Cited by the Examiner

FOREIGN PATENTS 853,286 11/1960 Great Britain.

OTHER REFERENCES

L. H. Thomas: IBM Technical Disclosure Bulletin, "Non-Linear Diode Logical Circuits," vol. 1, No. 6, April 1959 (pages 27–30).

ARTHUR GAUSS, *Primary Examiner.*

JOHN W. HUCKERT, *Examiner.*

J. ZAZWORSKY, *Assistant Examiner.*